United States Patent
Iketo et al.

(10) Patent No.: US 7,201,414 B2
(45) Date of Patent: Apr. 10, 2007

(54) SHOCK ABSORBING STRUCTURE FOR A VEHICLE

(75) Inventors: Masakazu Iketo, Okazaki (JP); Kazunari Azuchi, Himi (JP); Tadashi Sugimoto, Toyama (JP)

(73) Assignees: Aisin Seiki Kabushiki Kaisha, Kariya-shi, Aichi-ken (JP); Aisin Keikinzoku Kabushiki Kaisha, Shinminato-shi, Toyama (JP)

( * ) Notice: Subject to any disclaimer, the term of this patent is extended or adjusted under 35 U.S.C. 154(b) by 45 days.

(21) Appl. No.: 11/205,018

(22) Filed: Aug. 17, 2005

(65) Prior Publication Data
US 2006/0043744 A1 Mar. 2, 2006

(30) Foreign Application Priority Data
Aug. 27, 2004 (JP) ............................. 2004-248660

(51) Int. Cl.
*B60R 19/26* (2006.01)
(52) U.S. Cl. .................. 293/133; 296/187.03; 188/377
(58) Field of Classification Search ................ 293/133, 293/132; 296/187.03, 187.09, 187.11; 188/377
See application file for complete search history.

(56) References Cited

U.S. PATENT DOCUMENTS
6,971,694 B2 * 12/2005 Sakuma et al. ............. 293/133

FOREIGN PATENT DOCUMENTS
JP 2002-155980 5/2002

* cited by examiner

*Primary Examiner*—Joseph D. Pape
(74) *Attorney, Agent, or Firm*—Finnegan, Henderson, Farabow, Garrett & Dunner, LLP

(57) ABSTRACT

A shock absorbing structure for a vehicle comprises a bumper reinforcement extending in a vehicle width direction, a pair of side members extending in a longitudinal direction of the vehicle, a pair of crash boxes provided between the pair of side members and the bumper reinforcement, and the crash box including a crash box body being hollowed in a vertical direction so as to have a first opening, a second opening and side walls, wherein the bumper reinforcement is attached to one end of the crash box body, and a side member attachment flange is integrally formed at the other end of the crash box body, and a load adjusting plate fixed to the crash box body so as to cover at least one of the first opening and the second opening of the crash box body and to sandwich the side walls of the crash box body.

20 Claims, 4 Drawing Sheets

FIG. 6  Known work
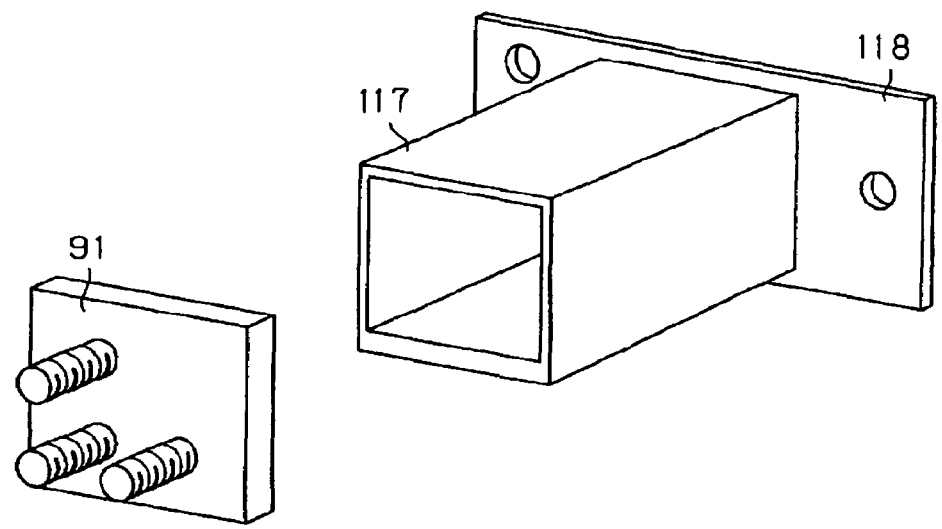
FIG. 7  Known work
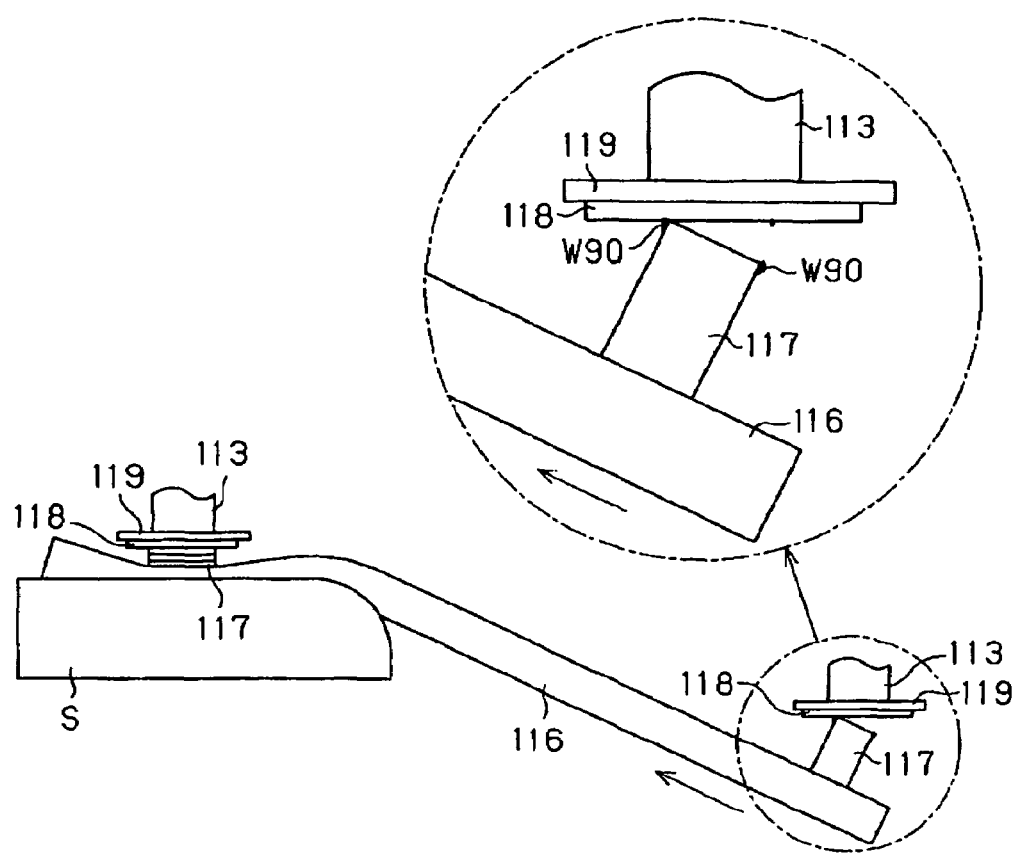

SHOCK ABSORBING STRUCTURE FOR A VEHICLE

CROSS REFERENCE TO RELATED APPLICATIONS

This application is based on and claims priority under 35 U.S.C. § 119 to Japanese Patent Application 2004-248660, filed on Aug. 27, 2004, the entire content of which is incorporated herein by reference.

FIELD OF THE INVENTION

The present invention relates to a shock absorbing structure for a vehicle.

BACKGROUND

A known shock absorbing structure for a vehicle disclosed in JP2002-155980A (US2002060463 A1) includes a bumper reinforcement 116 made of extruded aluminium so as to be hollowed, a pair of side members 113 extending in a longitudinal direction of the vehicle, and a crash box 117 provided between each of the side members 113 and the bumper reinforcement 116.

In this configuration, when the vehicle collides with another vehicle, a load is applied to the vehicle in an axial direction from the front of the vehicle, and the load further transmits to the crash box 117 through the bumper reinforcement 116. Such load is absorbed by means of the crash box 117 that is plastically deformed, as a result, the impact load can be absorbed.

The crash box 117 of the known shock absorbing structure disclosed in JP2002-155980 is made of extruded aluminium extending in a longitudinal direction of the vehicle, so that the crash box 117 includes a first opening facing the bumper reinforcement 116 and a second opening facing the side member 113.

In this configuration, as shown in FIG. 6, a bracket 91 is fixed by welding to the crash box 117 so as to cover the first opening thereof.

The crash box 117 is attached by screwing to the bumper reinforcement 116 by means of the bracket 91.

The crash box 117 is also attached to the bracket 119 of the side member 113 by screwing by means of the flange 118, which is fixed by welding to the crash box 117 and extends outward from the second opening of the crash box 117.

Further, when a load is applied to the crash box 117, which is provided on one end of the bumper reinforcement 116, in an axial direction of the vehicle upon an offset collision with, for example, another vehicle S, and when the crash box 117 is significantly plastically deformed, the crash box 117 provided on the other end of the bumper reinforcement 116 (on the opposite of the collided side) is pulled by means of the bumper reinforcement 116 so as to bend. Based upon this movement, the welding portion W90 between the flange 118 and the crash box 117 may split. As a result, in the event of an offset collision, impact load on the opposite of the collided side cannot be absorbed sufficiently.

Thus, a need exist to provide a shock absorbing structure for a vehicle which preferably absorb the impact load applied to the vehicle on the opposite of the collided side, especially in the event of an offset collision.

SUMMARY OF THE INVENTION

According to an aspect of the present invention, a shock absorbing structure for a vehicle comprises a bumper reinforcement extending in a vehicle width direction, a pair of side members extending in a longitudinal direction of the vehicle and provided in a manner where each of the side members is positioned at each end of the bumper reinforcement, a pair of crash boxes provided between the pair of side members and the bumper reinforcement in a manner where each of the crash boxes is positioned between each of the side members and the bumper reinforcement; and the crash box including a crash box body being hollowed in a vertical direction so as to have a first opening, a second opening and side walls which vertically extend between the first opening and the second opening, wherein the bumper reinforcement is attached to one end of the crash box body in a longitudinal direction of the vehicle, and a side member attachment flange, to which the side member is attached, is integrally formed at the other end of the crash box body in a longitudinal direction of the vehicle, and a load adjusting plate fixed to the crash box body so as to cover at least one of the first opening and the second opening of the crash box body and to sandwich the side walls of the crash box body.

According to another aspect of the present invention, a shock absorbing structure for a vehicle comprises a bumper reinforcement extending in a vehicle width direction, a pair of side members extending in a longitudinal direction of the vehicle and provided in a manner where each of the side members is positioned at each end of the bumper reinforcement, a pair of crash boxes provided between the pair of side members and the bumper reinforcement in a manner where each of the crash boxes is positioned between each of the side members and the bumper reinforcement; and the crash box including a crash box body being hollowed in a vertical direction so as to have a first opening, a second opening and side walls which vertically extend between the first opening and the second opening, wherein the bumper reinforcement is attached to one end of the crash box body in a longitudinal direction of the vehicle, and a side member attachment flange, to which the side member is attached, is integrally formed at the other end of the crash box body in a longitudinal direction of the vehicle, a first load adjusting plate having an upper plate portion and a pair of first projecting portions and fixed to the crash box body so as to cover the first opening of the crash box body by means of the upper plate portion and to sandwich the side walls of the crash box body by the first projecting portions, and a second load adjusting plate having an bottom plate portion and a pair of second projecting portions and fixed to the crash box body so as to cover the second opening of the crash box body by means of the bottom plate portion and to sandwich the walls of the crash box body by the second projecting portions.

BRIEF DESCRIPTION OF THE DRAWINGS

The foregoing and additional features and characteristics of the present invention will become more apparent from the following detailed description considered with reference to the accompanying drawings, wherein:

FIG. 6 illustrates an exploded perspective view indicating a know work; and

FIG. 7 illustrates a pattern diagram of a movement of the known work.

DETAILED DESCRIPTION

Figure 3:
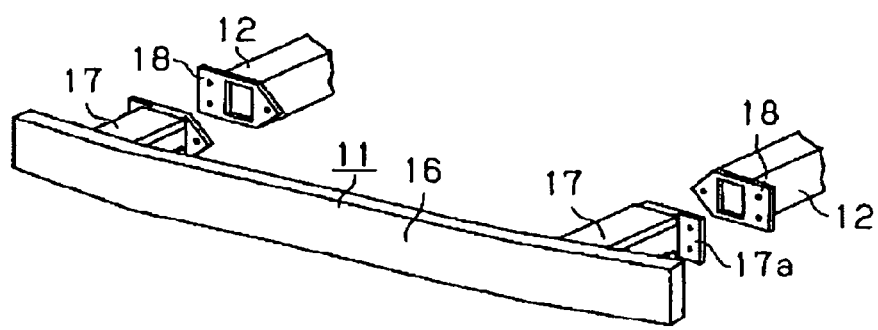
FIG. 3 illustrates a perspective view of a front portion of the vehicle.

An embodiment of the present invention will be described with reference to attached drawings. FIG. 3 illustrates a perspective view schematically indicating a front portion of a vehicle such as an automobile, to which a shock absorbing structure for a vehicle according to this embodiment is applied.

As shown in FIG. 3, a bumper frame 11 and a pair of side members 12 are located at the front portion of the vehicle. Specifically, the bumper frame 11 is a framework of a bumper, and each of the side members 12 forms a part of a vehicle body.

The bumper frame 11 includes a bumper reinforcement 16 extending in a vehicle width direction and a pair of crash boxes 17. Specifically, the bumper reinforcement 16 is made of extruded aluminium extending in a vehicle width direction so as to be hollowed. Each of the crash boxes 17 is attached to the bumper reinforcement 16 by screwing at both end portions thereof. Further, a pair of side members 12 is attached to the pair of crash boxes 17, in other words, the pair of side members 12 is attached to the bumper reinforcement 16 at both end portions thereof by means of the pair of crash boxes 17.

As described later, each front end of the crash boxes 17 is screwed to the bumper reinforcement 16, and a side member attachment flange 17a, by which the side member 12 is attached to the crash boxes 17 by screwing, is formed at each rear end of the crash boxes 17. The side member attachment flange 17a protrudes in both side of the crash box 17 in a width direction of the vehicle.

The side member 12 is formed in a rectangular cylindrical shape so as to extend in a longitudinal direction of the crash box 17, which corresponds to a longitudinal direction of the vehicle. At each front end of the side members 12, a bracket 18 is provided so as to correspond and face the side member attachment flange 17a of the crash box 17. Thus, the bumper frame 11 is fixed to the vehicle body (side members 12) in a manner where the bracket 18 of the side member 12 is attached to the side member attachment flange 17a of the crash box 17 by screwing.

Figure 1A:
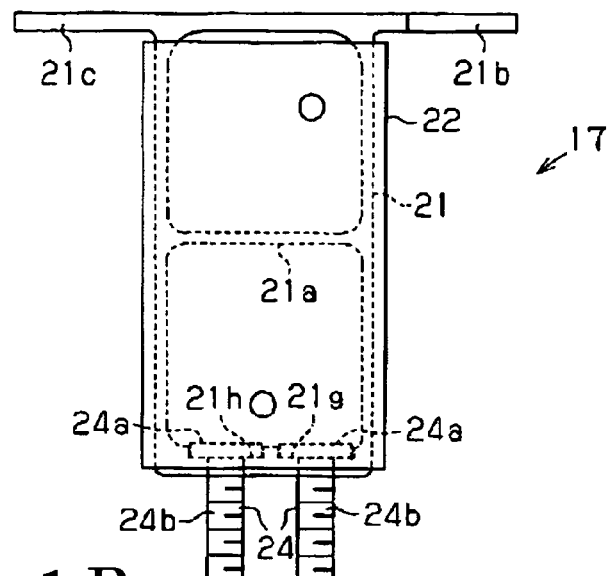
FIG. 1A illustrates a flat view indicating a shock absorbing structure according to the embodiment.
Figure 1B:
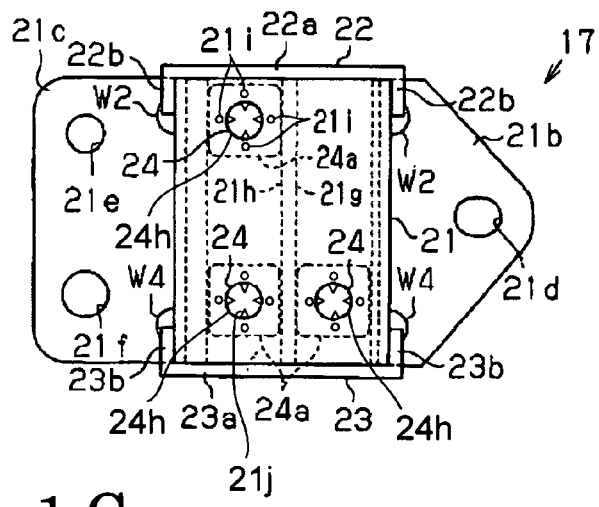
FIG. 1B illustrates a front view indicating the shock absorbing structure according to the embodiment.
Figure 1C:
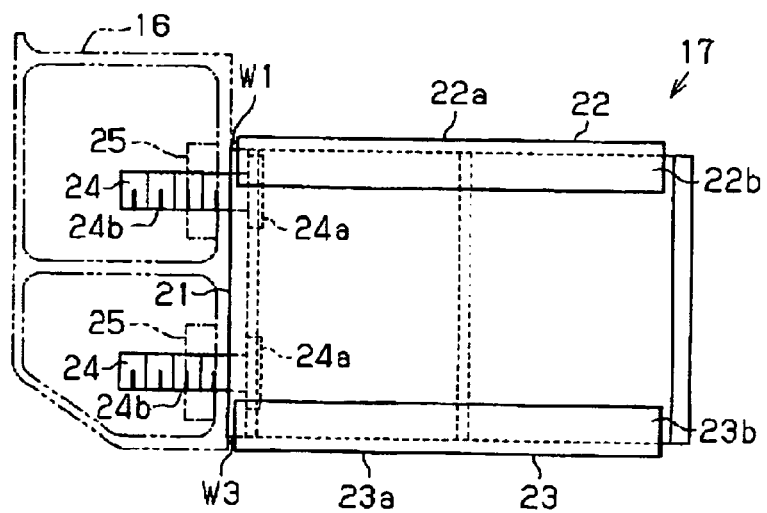
FIG. 1C illustrates a side view indicating the shock absorbing structure according to the embodiment.
Figure 2:
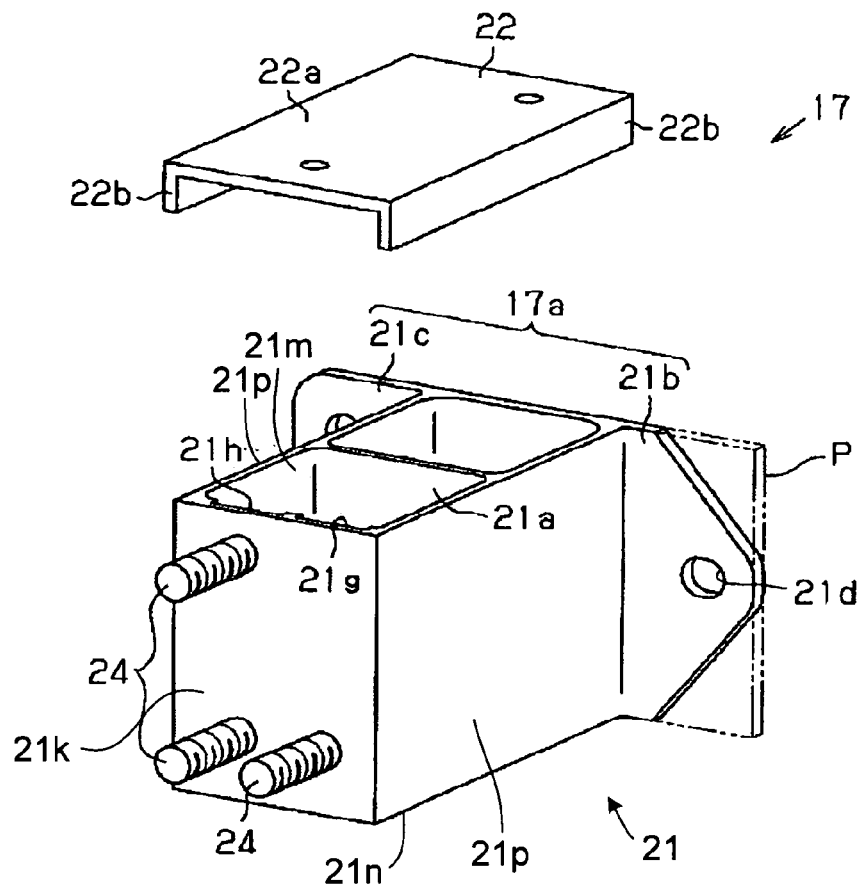
FIG. 2 illustrates an exploded perspective view indicating the shock absorbing structure according to the embodiment.

The structure of the crash boxes 17 will be further described with reference to FIG. 1A, FIG. 1B, FIG. 1C and FIG. 2. In this embodiment, the pair of crash boxes 17 is provided so as to be symmetrical in a vehicle width direction. In FIG. 1A, FIG. 1B, FIG. 1C and FIG. 2 illustrates the crash box 17 provided on the right side of the vehicle. Specifically, FIG. 1A illustrates a flat view of the crash box 17, FIG. 1B illustrates a front view of the crash box 17, FIG. 1C illustrates a side view of the crash box 17, and FIG. 2 illustrates an exploded perspective view of the crash box 17. As shown in FIG. 2, the crash box 17 includes a crash box body 21, a first load adjusting plate 22 and a second load adjusting plate 23. The crash box 17 may include either one of the first load adjusting plate 22 or the second load adjusting plate 23 alternatively.

As shown in FIG. 1A and FIG. 2, the crash box body 21 is formed in an approximately rectangular cylindrical shape so as to have two openings 21m and 21n, which open upward and downward. Inside the crash box body 21, a separating wall 21a is formed in order to separate an inner space of the crash box body 21 into two sections so that the crash box body 21 has a figure-of-8-shape constant cross section along its axis. Further, plate shaped flanges 21b and 21c are integrally formed on a rear wall portion of the crash box body 21 so as to protrude in one direction and the other direction, for example right and left in FIG. 1A. Specifically, as shown in FIG. 1B, the flange 21b is formed in a triangle shape and positioned in a manner where a peak thereof is located on the right end thereof in FIG. 1B, and a long hole 21d, in which a bolt is inserted, is formed at a central portion of the flange 21b. On the other hand, the flange 21c is formed in a rectangular shape, and left ends thereof are chamfered as shown in FIG. 1B, and hole 21e, into which bolts are inserted, is formed on an upper portion of the flange 21c and hole 21f, into which bolts are inserted, is formed on a lower portion of the flange 21c. Thus, the side member attachment flange 17a includes flange 21b and 21c, specifically, the crash box body 21 integrally includes the side member attachment flange 17a (flanges 21b and 21c).

Further, on an inner surface of a front wall portion 21k (first wall portion) of the crash box body 21, grooves 21g and 21h are formed in pairs. Each of the groove portions 21g and 21h extending in a vertical direction includes a constant cross section, and they are juxtaposed in a width direction of the vehicle. Further, a width of the groove 21g is identical with a width of the groove 21h.

Further, holes 24h are formed on the groove portions 21g and 21h, and plural bolts 24 are inserted into holes 24h in order to assemble the crash box 17 to the bumper reinforcement 16. Specifically, one bolt 24 is inserted into the hole 24h of the groove portion 21g, and two bolts 24 are inserted into the holes 24h of the groove portion 21h. Specifically, as shown in FIG. 1A and FIG. 1B, each of the bolts 24 includes a square-shaped stopper portion 24a (a head portion) and a screw portion 24b. Specifically, each length of sides of the stopper portion 24a is identical with each width of the groove portions 21g and 21h, and the screw portion 24b is formed so as to protrude from the stopper portion 24a in a longitudinal direction of the vehicle.

In this circumstance, the bolts 24 are screwed into the holes 24h of the groove portions 21g and 21h from inside of the crash box body 21 in a manner where the stopper portions 24a fit to the groove portions 21g and 21h. Because the square-shaped stopper portions 24a fit within the groove portions 21g and 21h, the bolts 24 are regulated so as not to rotate.

Each of the screw portions 24b penetrated through each of the holes 24h of the groove portions 21g and 21h is caulked to the crash box body 21 at caulking portions 21i. Specifically, while each of the screw portions 24b is inserted into each of the holes 24h, the front wall portion 21k of the crash box body 21 are caulked at plural (four) caulking portions 21i in a thickness direction thereof in order to caulk the screw 24 to the crash box body 21. More specifically, when the front wall portion 21k of the crash box body 21 is caulked at the caulking portions 21i while the bolts 24 penetrate through the holes 24h formed the groove portions 21g and 21h, an inner peripheral portion of each of the holes 24h partially project so as to form plural protruding portions 21*j* as shown in FIG. 1B. In this embodiment, four protruding portions 21*j* projecting inward are formed on each of the holes of the groove portions 21*g* and 21*h*. The protruding portions 21*j* engage with root portions of the screw portions 24*b*, as a result, the bolt 24 is fixed so as not to move in an axial direction thereof.

Thus, each of the bolts 24 is regulated by the protruding portions 21*j*, which is formed by caulking at the caulking portions 21*i* so as not to move in an axial direction thereof, and further regulated by the stopper portion 24*a* so as not to rotate in a circumferential direction thereof. In circumstances where the first load adjusting plate 22 and second load adjusting plate 23 are welded to the crash box body 21, if the bolt 24 falls off from the hole 24*h* of the groove portion 21*g* or 21*h*, the welded load adjusting plate 22 or 23 needs to be removed to insert the bolt 24 into the hole 24*h* again. According to this embodiment, because each bolt 24 is regulated by means of the projecting portion 21*j* and the stopper portion 24*a*, it can be prevented that the bolt 24 falls off from the hole 24*h* during the assembling operation, and thus, operatability can be improved.

Thus, the crash box body 21 (crash box 17) is fixed to the bumper reinforcement 16 by screwing in a manner where the screw portions 24*b*, which are inserted into the holes 24*h* of the groove portions 21*g* and 21*h*, are further inserted into holes of the bumper reinforcement 16, and each of the nuts 25 is tighten to each of the screw portions 24*b* from inside of the bumper reinforcement 16 (shown in FIG. 1C).

The first load adjusting plate 22 is made of, for example, extruded aluminium base alloy so as to have a constant approximate C-shape cross section.

The first load adjusting plate 22 adapted to be attached to the crash box 17 is formed by extruding in a longitudinal direction of the vehicle, while the crash box 17, to which the bracket 18 of the side member 12 is attached, is mounted to the bumper frame 11. Specifically, the first load adjusting plate 22 includes an upper plate portion 22*a* and a pair of first projecting portions 22*b*, and the upper plate portion 22*a* extends in a horizontal direction, and each of the first projecting portions 22*b* extends in a vertical direction from an end of the upper plate portion 22*a*.

While the crash box 17 including the first load adjusting plate 22 and the crash box body 21 is assembled to the bumper reinforcement 16, the length of the first load adjusting plate 22 in a longitudinal direction of the vehicle is slightly shorter than the length of the crash box body 21 in a longitudinal direction of the vehicle.

The distance between the first projecting portions 22*b* is set so as to be identical with the length of the crash box body 21 in its width direction.

The first load adjusting plate 22 is attached to the crash box body 21 in a manner where the upper opening 21*m* of the crash box body 21 is covered by the upper plate portion 22*a* of the first load adjusting plate 22, and upper portions of side walls 21*p*, which vertically extend between the upper opening 21*m* and the lower opening 21*n*, are sandwiched between the first projecting portions 22*b*.

Thus, the first load adjusting plate 22 is fixed to the crash box body 21 by welding at a welding portion W1 (shown in FIG. 1C) positioned on a front end portion of the upper plate portion 22*a* and a welding portion W2 (shown in FIG. 1B) positioned on each lower end portion of the first projecting portions 22*b*.

The second load adjusting plate 23 is made of, for example, extruded aluminium base alloy so as to have a constant approximate C-shape cross section.

The second load adjusting plate 23 adapted to be attached to the crash box 17 is formed by extruding in a longitudinal direction of the vehicle, while the crash box 17, to which the bracket 18 of the side member 12 is attached, is mounted to the bumper frame 11.

Specifically, the second load adjusting plate 23 includes an bottom plate portion 23*a* and a pair of second projecting portions 23*b*, and the bottom plate portion 23*a* extends in a horizontal direction, and each of the second projecting portions 23*b* extends in a vertical direction from an end of the bottom plate portion 23*a*.

While the crash box 17 including the second load adjusting plate 23 and the crash box body 21 is assembled to the bumper reinforcement 16, the length of the second load adjusting plate 23 in a longitudinal direction of the vehicle is slightly shorter than the length of the crash box body 21 in a longitudinal direction of the vehicle.

The distance between the second projecting portions 23*b* is set so as to be identical with the length of the crash box body 21 in its width direction.

The second load adjusting plate 23 is attached to the crash box body 21 in a manner where the lower opening 21*n* of the crash box body 21 is covered by the bottom plate portion 23*a* of the second load adjusting plate 23, and lower portions of side walls 21*p*, which vertically extend between the upper opening 21*m* and the lower opening 21*n*, are sandwiched between the second projecting portions 23*b*.

Thus, the second load adjusting plate 23 is fixed to the crash box body 21 by welding at a welding portion W3 (shown in FIG. 1C) positioned on a front end portion of the bottom plate portion 23*a* and a welding portion W4 (shown in FIG. 1B) positioned on each upper end portion of the second projecting portions 23*b*.

In this embodiment, because the shape of the first load adjusting plate 22 is identical with the shape of the second load adjusting plate 23, same parts can be commonly used as the first load adjusting plate 22 and the second load adjusting plate 23.

A process for manufacturing the crash box body 21 will be schematically explained. In this process, a rough form of the crash box body 21, which is hollowed so as to have a constant cross section in an axial direction thereof, is made of, for example, extruded aluminium base alloy. In this process, the separating wall 21*a* and the groove portions 21*g* and 21*h* are also formed on the crash box body 21. The rough form of the crash box body 21 includes protruding portions P (shown in FIG. 2), which are supposed to be processed into the flanges 21*b* and 21*c*. The protruding portions P are formed in a rectangular shape so as to have a constant cross section. Then, each of the projection portions P is chamfered so as to form the flanges 21*b* and 21*c*. Further, as mentioned above, the long hole 21*d* is formed on the flange 21*b*, and the holes 21*e* and 21*f* are formed on the flange 21*c*. Thus the crash box body 21 is manufactured so as to integrally have the flanges 21*b* and 21*c*, the separating wall 21*a* and the groove portions 21*g* and 21*h*. Thus the crash box body 21 is extruded so as to extend in a vertical direction of the vehicle while each of the crash box bodies 21 mounted to each of the crash boxes 17 (the bumper frame 11) is attached to the bracket 18 of the side member 12 by screwing.

Then, the bolts 24 are inserted through the holes 24*h* on the groove portions 21*g* and 21*h* of the crash box body 21, and the first and the second load adjusting plates 22 and 23 are welded to the crash box body 21, as a result, the crash box 17 is assembled. Further, each of the crash boxes 17 is attached to the bumper reinforcement 16 by means of the bolts 24 and the nuts 25, as a result, the bumper frame 11 is assembled. Furthermore, as mentioned above, such bumper frame 11 is fixed to the vehicle body by screwing each of the side member attachment flange 17a (flanges 21b and 21c) and each bracket 18 of the side members 12 together.

When a load is applied to a vehicle having the above configuration from the front of the vehicle (a load is applied in an axial direction) upon a collision with, for example another vehicle, the crash boxes 17 can be plastically deformed in a longitudinal direction thereof in order to absorb the load, as a result, the impact load upon the collision can be reduced. Further, the collision impact transmitted to a passenger of the vehicle by means of the vehicle body (side member 12) can also be reduced.

Figure 4:
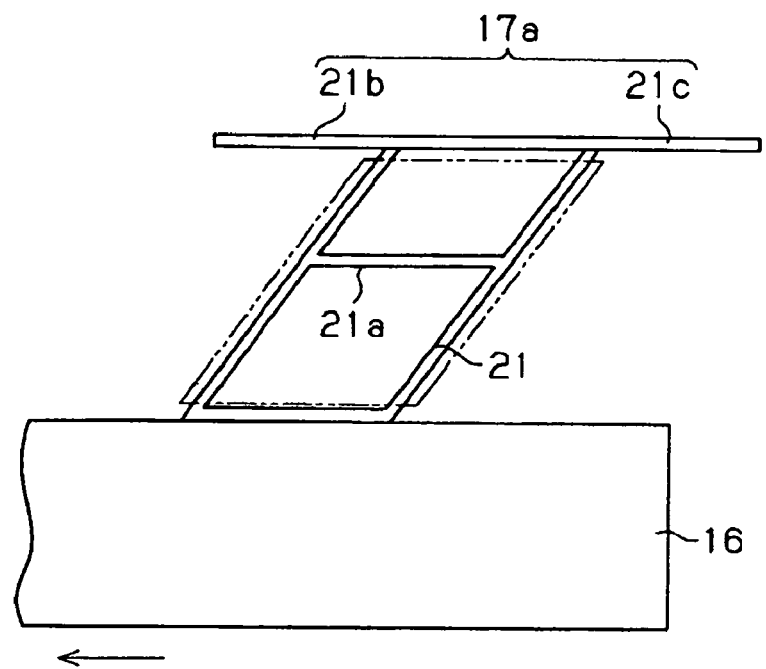
FIG. 4 illustrates a pattern diagram of a movement of the shock absorbing structure according to the embodiment.

Further, when a load is applied to the crash box 17 (crash box body 21), which is provided on one end of the bumper reinforcement 16 upon a collision with, for example another vehicle, and the crash box 17 is significantly plastically deformed in a longitudinal direction thereof, the crash box 17 (crash box body 21) provided on the other end of the bumper reinforcement 16 (on the opposite of the collided side, or the right side in FIG. 3) is pulled by means of the bumper reinforcement 16 so as to bend as shown in FIG. 4. In this circumstance, because the side member attachment flange 17a (flanges 21b and 21c) is integrally formed on the crash box body 21 so as to have enough rigidity, even when the crash box body 21 provided on the other side is bent and a cross section thereof is deformed (plastically deformed), possibility that the side member attachment flange 17a provided on the other side fractures can be reduced.

Specifically, because the bumper reinforcement and the crash box are not welded, and the crash box and the bracket of the side member are not welded, it can be prevented that the connecting portions (such as the welding portion W90 in JP2002-155980) split.

Thus, possibility that the crash box 17 provided on the opposite of the collided side is off from the side member 12 can be reduced.

Figure 5:
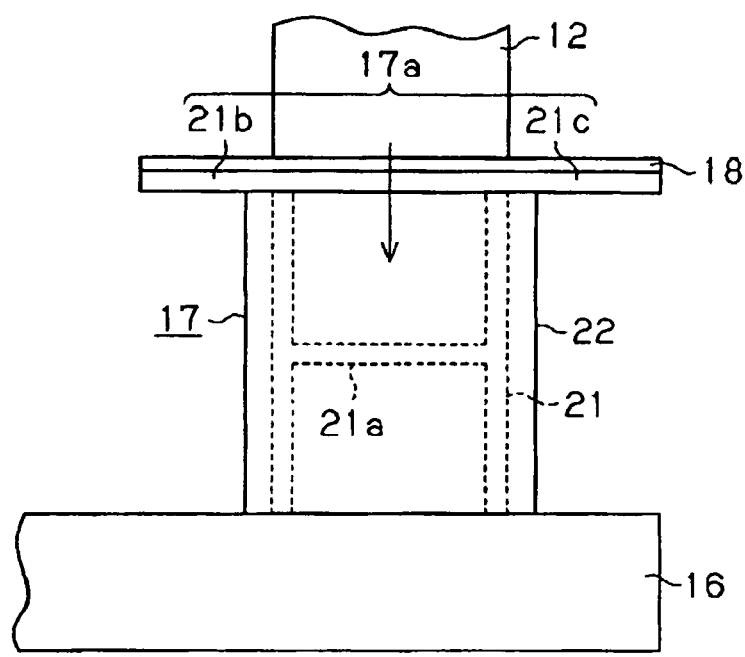
FIG. 5 illustrates another pattern diagram of a movement of the shock absorbing structure according to the embodiment.

Further, as shown in FIG. 5, the upper opening 21m of the crash box body 21 is covered by the first load adjusting plate 22, and the lower opening 21n of the crash box body 21 is covered by the second load adjusting plate 23, and the upper portions of side walls 21p, which vertically extend between the upper opening 21m and the lower opening 21n, are sandwiched between the first projecting portions 22b of the first load adjusting plate 22, and the lower portions of side walls 21p are sandwiched between the second projecting portions 23b of the second load adjusting plate 23. Thus, a level of the deformation of the cross section of the crash box body 21 provided on the opposite of the collided side can be eased. Thus, in the event of an offset collision, on the opposite of the collided side, the side member 12 attached by means of the side member attachment flange 17a (or the bracket 18 on the same side) is pulled forward so as to be plastically deformed, as a result the impact load upon the collision can be preferably absorbed. Thus, the collision impact transmitted to a passenger of the vehicle through the vehicle body (side member 12) can be reduced.

Following effects can be obtained according to this embodiment.

(1) According to this embodiment, in the event of an offset collision, an impact load can be preferably absorbed on the opposite of the collided side.

(2) According to this embodiment, because the pair of crash boxes 17 is positioned so as to be symmetrical in a vehicle width direction, a same assembling process can be applied to each of the crash boxes 17; as a result, the assembling process can be simplified.

(3) According to this embodiment, because the shape of the first load adjusting plate 22 and the shape of the second load adjusting plate 23 are identical, same parts can be commonly used as the first load adjusting plate 22 and the second load adjusting plate 23. Thus, the number of parts of the crash box 17 can be reduced.

(4) According to this embodiment, the crash box body 21 can be manufactured by use of a simple method such as extruding the aluminium base alloy material.

(5) According to this embodiment, the first load adjusting plate 22 and the second load adjusting plate 23 can be made by a simple method such as an extrusion of the aluminium base alloy.

This embodiment may be modified as follows. The both crash boxes 17 may have an identical structure. In such case, because both crash boxes 17 may be the same parts, as a result, the number of parts of the bumper frame 11 can be reduced.

Further, because there is no need to distinguish between the right crash box 17 and the left crash box 17, the manufacturing process can be simplified.

In this embodiment, the structure of the first load adjusting plate 22, which is attached to the crash box body 21, may differ from the structure of the second load adjusting plate 23, which is attached to the same crash box body 21. In this case, flexibility on design can be enhanced.

In this embodiment, the crash box body 21 may have any shape of constant cross section as far as the crash box body is hollowed so as to open upward and downward.

In this embodiment, the crash box body 21 is made of extruded aluminium base alloy, however, the crash box body 21 may be manufactured by another method such as cutting.

In this embodiment, the first load adjusting plate 22 and the second load adjusting plate 23 are made of extruded aluminium base alloy, however, the first load adjusting plate 22 and the second load adjusting plate 23 may be manufactured by another method such as bending a steel plate.

In this embodiment, the crash box 17 (the crash box body 21, the first load adjusting plate 22 and the second load adjusting plate 23) are made of aluminium base alloy material, however, these parts may be made of another material instead.

The shock absorbing structure in this embodiment is applied to the bumper (bumper frame 11) provided at the front portion of the vehicle, however, it may be applied to a bumper provided at the rear portion of the vehicle.

According to this embodiment, when a load is applied in an axial direction of the vehicle to one crash box, which is provided on one end of the bumper reinforcement, upon an offset collision with, for example another vehicle, and the crash box is significantly plastically deformed; another crash box (crash box body) provided on the other end of the bumper reinforcement (on the opposite of the collided side) is pulled by means of the bumper reinforcement so as to bend. However, because the side member attachment flange is integrally formed on each of the crash box body, the side member attachment flange has significant rigidity. Thus, although a cross section of the crash box body is deformed (the crash box is plastically deformed) due to the bend, possibility that the flange fractures based on the bend can be reduced. Thus, possibility that the crash box on the opposite of the collided side is off from the side member can be reduced.

Further, because the upper and lower openings of the crash box body are covered by means of the first and second load adjusting plates, and the upper portions of side walls 21*p*, which vertically continue from both side ends of the upper opening 21*m*, are sandwiched by the projecting portions of the first load adjusting plate, and the lower portions of the side walls 21*p*, which vertically continue from both side ends of the lower opening, are sandwiched by the projecting portions of the second load adjusting plate, possibility that the cross section of the crash box on the opposite side of an offset collision is deformed can be reduced.

Thus, in the event of the offset collision, the side member on the opposite of the collided side is pulled in a longitudinal direction of the vehicle by means of the crash box on the opposite of the collided side so as to be plastically deformed, as a result, the impact load applied to the vehicle can be preferably absorbed.

According to this embodiment, the crash box body or the load adjusting plate can be made of extruded aluminium base alloy by a simple method such as an extrusion.

Further, according to this embodiment, the crash box body is attached to the bumper reinforcement by screwing the bolt, and the bolt is regulated so as not to rotate in a manner where the head portion of the bolt engages with the groove portion, as a result operatability of screwing the crash box body to the bumper reinforcement can be enhanced.

Furthermore, according to this embodiment, the bolt inserted into the hole on the front wall portion of the crush box is caulked so as not move in an axial direction of the bolt, as a result, it can be prevented that the bolt falls off from the hole on the front wall portion of the crush box during the assembling operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A shock absorbing structure for a vehicle comprising:
   a bumper reinforcement extending in a vehicle width direction;
   a pair of side members extending in a longitudinal direction of the vehicle and provided in a manner where each of the side members is positioned at each end of the bumper reinforcement;
   a pair of crash boxes provided between the pair of side members and the bumper reinforcement in a manner where each of the crash boxes is positioned between each of the side members and the bumper reinforcement; and
   the crash box including,
      a crash box body being hollowed in a vertical direction so as to have a first opening, a second opening and side walls which vertically extend between the first opening and the second opening, wherein the bumper reinforcement is attached to one end of the crash box body in a longitudinal direction of the vehicle, and a side member attachment flange, to which the side member is attached, is integrally formed at the other end of the crash box body in a longitudinal direction of the vehicle, and
      a load adjusting plate fixed to the crash box body so as to cover at least one of the first opening and the second opening of the crash box body and to sandwich the side walls of the crash box body.

2. The shock absorbing structure for a vehicle according to claim 1, wherein the crash box body is made of extruded aluminium extending in a vertical direction of the vehicle.

3. The shock absorbing structure for a vehicle according to claim 1, wherein the load adjusting plate is made of extruded aluminium extending in a longitudinal direction of the vehicle.

4. The shock absorbing structure for a vehicle according to claim 2, wherein the load adjusting plate is made of extruded aluminium extending in a longitudinal direction of the vehicle.

5. The shock absorbing structure for a vehicle according to claim 1 further including:
   a first wall portion formed at one end of the crash box body;
   a hole formed on the first wall portion; and
   a groove portion formed on an inner surface of the first wall portion so as to be recessed,
   wherein a bolt inserted into the hole formed on the first wall portion and screwed into the bumper reinforcement in a manner where a head portion of the bolt is engaged with the groove portion of the first wall portion so as to regulate the rotation of the bolt.

6. The shock absorbing structure for a vehicle according to claim 2 further including:
   a first wall portion formed at one end of the crash box body;
   a hole formed on the first wall portion; and
   a groove portion formed on an inner surface of the first wall portion so as to be recessed,
   wherein a bolt inserted into the hole formed on the first wall portion and screwed into the bumper reinforcement in a manner where a head portion of the bolt is engaged with the groove portion of the first wall portion so as to regulate the rotation of the bolt.

7. The shock absorbing structure for a vehicle according to claim 3 further including:
   a first wall portion formed at one end of the crash box body;
   a hole formed on the first wall portion; and
   a groove portion formed on an inner surface of the first wall portion so as to be recessed,
   wherein a bolt inserted into the hole formed on the first wall portion and screwed into the bumper reinforcement in a manner where a head portion of the bolt is engaged with the groove portion of the first wall portion so as to regulate the rotation of the bolt.

8. The shock absorbing structure for a vehicle according to claim 4 further including:
   a first wall portion formed at one end of the crash box body;
   a hole formed on the first wall portion; and
   a groove portion formed on an inner surface of the first wall portion so as to be recessed,
   wherein a bolt inserted into the hole formed on the first wall portion and screwed into the bumper reinforcement in a manner where a head portion of the bolt is engaged with the groove portion of the first wall portion so as to regulate the rotation of the bolt.

9. The shock absorbing structure for a vehicle according to claim 1 further including:
   a first wall portion formed at one end of the crash box body;

a hole formed on the first wall portion; and
a protruding portion formed on an inner peripheral surface of the hole formed on the first wall portion so as to protrude in a radial direction of the hole,
wherein a bolt inserted into the hole formed on the first wall portion and screwed into the bumper reinforcement in a manner where a screw portion of the bolt is engaged with the protruding portion.

10. The shock absorbing structure for a vehicle according to claim 2, wherein the shock absorbing structure for a vehicle further including:
a first wall portion formed at one end of the crash box body;
a hole formed on the first wall portion; and
a protruding portion formed on an inner peripheral surface of the hole formed on the first wall portion so as to protrude in a radial direction of the hole,
wherein a bolt inserted into the hole formed on the first wall portion and screwed into the bumper reinforcement in a manner where a screw portion of the bolt is engaged with the protruding portion.

11. The shock absorbing structure for a vehicle according to claim 3 further including:
a first wall portion formed at one end of the crash box body;
a hole formed on the first wall portion; and
a protruding portion formed on an inner peripheral surface of the hole formed on the first wall portion so as to protrude in a radial direction of the hole,
wherein a bolt inserted into the hole formed on the first wall portion and screwed into the bumper reinforcement in a manner where a screw portion of the bolt is engaged with the protruding portion.

12. The shock absorbing structure for a vehicle according to claim 4 further including:
a first wall portion formed at one end of the crash box body;
a hole formed on the first wall portion; and
a protruding portion formed on an inner peripheral surface of the hole formed on the first wall portion so as to protrude in a radial direction of the hole,
wherein a bolt inserted into the hole formed on the first wall portion and screwed into the bumper reinforcement in a manner where a screw portion of the bolt is engaged with the protruding portion.

13. The shock absorbing structure for a vehicle according to claim 5 further including a protruding portion formed on an inner peripheral surface of the hole formed on the first wall portion so as to protrude in a radial direction of the hole, wherein the bolt inserted into the hole formed on the first wall portion and screwed into the bumper reinforcement in a manner where a screw portion of the bolt is engaged with the protruding portion.

14. The shock absorbing structure for a vehicle according to claim 6 further including a protruding portion formed on an inner peripheral surface of the hole formed on the first wall portion so as to protrude in a radial direction of the hole, wherein the bolt inserted into the hole formed on the first wall portion and screwed into the bumper reinforcement in a manner where a screw portion of the bolt is engaged with the protruding portion.

15. The shock absorbing structure for a vehicle according to claim 7 further including a protruding portion formed on an inner peripheral surface of the hole formed on the first wall portion so as to protrude in a radial direction of the hole, wherein the bolt inserted into the hole formed on the first wall portion and screwed into the bumper reinforcement in a manner where a screw portion of the bolt is engaged with the protruding portion.

16. The shock absorbing structure for a vehicle according to claim 8 further including a protruding portion formed on an inner peripheral surface of the hole formed on the first wall portion so as to protrude in a radial direction of the hole, wherein the bolt inserted into the hole formed on the first wall portion and screwed into the bumper reinforcement in a manner where a screw portion of the bolt is engaged with the protruding portion.

17. A shock absorbing structure for a vehicle comprising:
a bumper reinforcement extending in a vehicle width direction;
a pair of side members extending in a longitudinal direction of the vehicle and provided in a manner where each of the side members is positioned at each end of the bumper reinforcement;
a pair of crash boxes provided between the pair of side members and the bumper reinforcement in a manner where each of the crash boxes is positioned between each of the side members and the bumper reinforcement; and
the crash box including,
a crash box body being hollowed in a vertical direction so as to have a first opening, a second opening and side walls which vertically extend between the first opening and the second opening, wherein the bumper reinforcement is attached to one end of the crash box body in a longitudinal direction of the vehicle, and a side member attachment flange, to which the side member is attached, is integrally formed at the other end of the crash box body in a longitudinal direction of the vehicle,
a first load adjusting plate having an upper plate portion and a pair of first projecting portions and fixed to the crash box body so as to cover the first opening of the crash box body by means of the upper plate portion and to sandwich the side walls of the crash box body by the first projecting portions, and
a second load adjusting plate having a bottom plate portion and a pair of second projecting portions and fixed to the crash box body so as to cover the second opening of the crash box body by means of the bottom plate portion and to sandwich the side walls of the crash box body by the second projecting portions.

18. The shock absorbing structure for a vehicle according to claim 1, wherein each of the crash boxes are formed and positioned so as to be symmetrical in a vehicle width direction.

19. The shock absorbing structure for a vehicle according to claim 17, wherein each of the crash boxes are formed and positioned so as to be symmetrical in a vehicle width direction.

20. The shock absorbing structure for a vehicle according to claim 17, wherein the first load adjusting plate and the second load adjusting plate have a same structure.

* * * * *